US010562048B2

(12) United States Patent
Chen et al.

(10) Patent No.: US 10,562,048 B2
(45) Date of Patent: Feb. 18, 2020

(54) ELECTROHYDRODYNAMIC ATOMIZATION NOZZLE EMITTING A LIQUID SHEET

(75) Inventors: Daren Chen, St. Louis, MO (US); Jingjie Zhang, St. Louis, MO (US)

(73) Assignee: Nanocopoeia, LLC, St. Paul, MN (US)

( * ) Notice: Subject to any disclaimer, the term of this patent is extended or adjusted under 35 U.S.C. 154(b) by 500 days.

(21) Appl. No.: 13/979,260

(22) PCT Filed: Jan. 18, 2012

(86) PCT No.: PCT/US2012/021723
§ 371 (c)(1),
(2), (4) Date: Jul. 31, 2013

(87) PCT Pub. No.: WO2012/099961
PCT Pub. Date: Jul. 26, 2012

(65) Prior Publication Data
US 2014/0158787 A1    Jun. 12, 2014

Related U.S. Application Data

(60) Provisional application No. 61/434,249, filed on Jan. 19, 2011.

(51) Int. Cl.
*B05B 5/053* (2006.01)
*B05B 1/06* (2006.01)
(Continued)

(52) U.S. Cl.
CPC .............. *B05B 5/0533* (2013.01); *B01J 2/04* (2013.01); *B05B 1/044* (2013.01); *B05B 1/06* (2013.01);
(Continued)

(58) Field of Classification Search
CPC ......... B05B 7/065; B05B 7/025; B05B 7/061; B05B 7/0533; B05B 7/06
(Continued)

(56) References Cited

U.S. PATENT DOCUMENTS 4,148,932 A * 4/1979 Tada .................... B05B 5/0407
239/3
4,749,125 A 6/1988 Escallon et al.
(Continued)

FOREIGN PATENT DOCUMENTS

EP     0216502 A1     4/1987
EP     0250164 A2    12/1987
(Continued)

OTHER PUBLICATIONS

Extended European Search Report issued in European Application No. 12726538.5 dated May 30, 2017, 16 pages.

*Primary Examiner* — Jason J Boeckmann
(74) *Attorney, Agent, or Firm* — Hamre, Schumann, Mueller & Larson, P.C.

(57) ABSTRACT

Embodiments for producing un-agglomerated, monodisperse droplets using a liquid sheet are provided. Nozzles with exit slit openings shape a spray liquid into a thin liquid sheet as the spray liquid exits from the slit opening. Stable multi-jet operation is achieved by including notches along the edge of the slit. The notches separate the liquid sheet into multiple jets to provide anchoring and stable multi jet operation. In some embodiments, the liquid sheet electrospray techniques and nozzles described herein provide high mass throughput and versatile multiplexing spray systems while reducing the engineering effort and high manufacturing cost.

16 Claims, 12 Drawing Sheets

Figure 1:
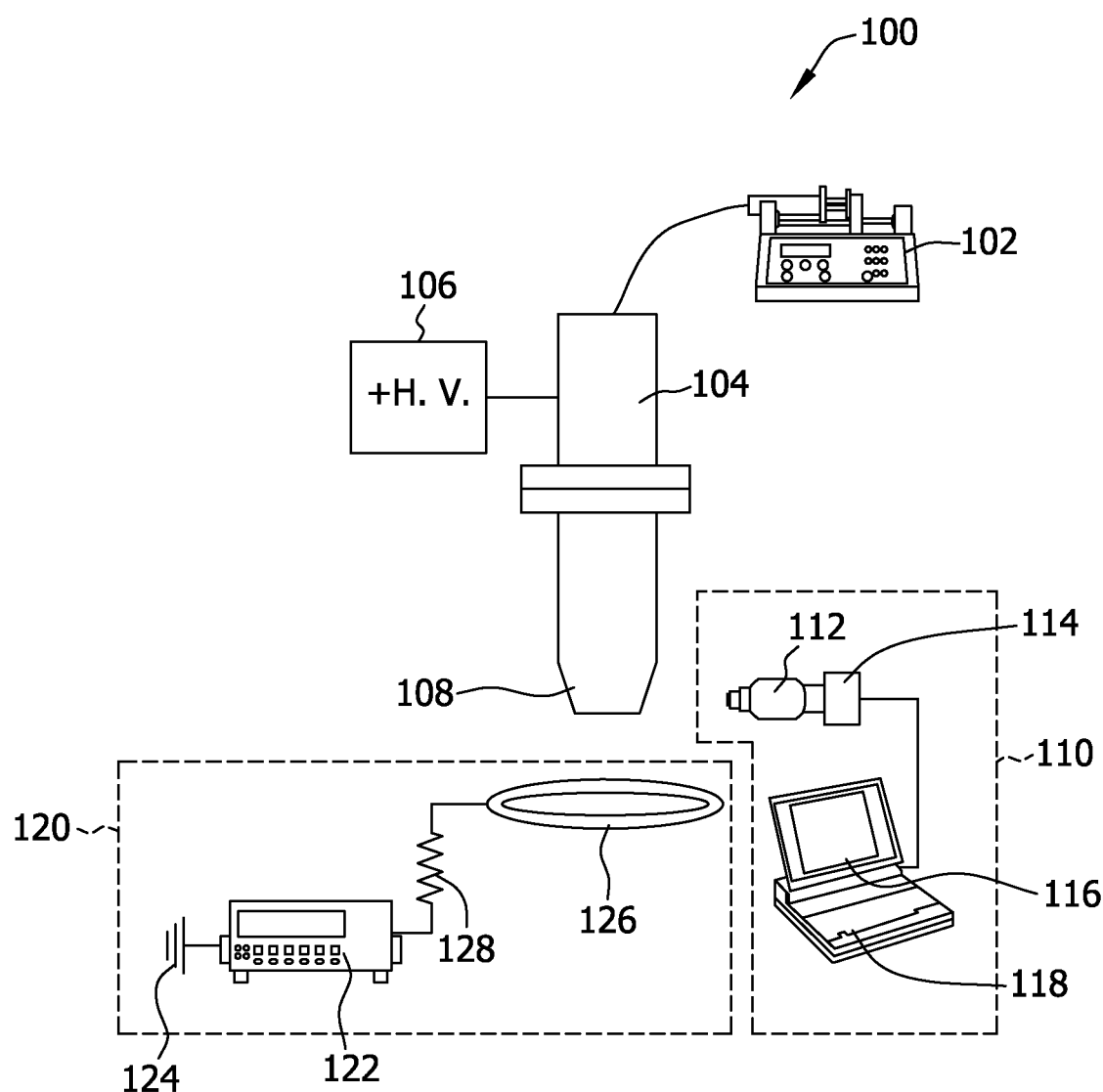

(51) Int. Cl.
*B05B 7/06* (2006.01)
*B05B 5/025* (2006.01)
*B05B 1/04* (2006.01)
*B01J 2/04* (2006.01)

(52) U.S. Cl.
CPC ............ *B05B 5/0255* (2013.01); *B05B 7/061* (2013.01); *B05B 7/065* (2013.01)

(58) Field of Classification Search
USPC ................... 239/3, 690, 691, 697, 698, 708
See application file for complete search history.

(56) References Cited

U.S. PATENT DOCUMENTS

| | | | | |
|---|---|---|---|---|
| 4,801,086 A | * | 1/1989 | Noakes | B05B 5/0255 239/3 |
| 4,846,407 A | * | 7/1989 | Coffee | B05B 5/0255 239/690 |
| 5,503,255 A | * | 4/1996 | Martinsson | B27B 17/083 188/77 W |
| 5,503,335 A | * | 4/1996 | Noakes | B05B 5/0255 239/145 |
| 6,093,557 A | | 7/2000 | Pui et al. | |
| 6,252,129 B1 | * | 6/2001 | Coffee | A61F 13/00085 239/3 |
| 6,399,362 B1 | | 6/2002 | Pui et al. | |
| 6,746,869 B2 | | 6/2004 | Pui et al. | |
| 6,764,720 B2 | | 7/2004 | Pui et al. | |
| 7,247,338 B2 | | 7/2007 | Pui et al. | |
| 7,279,322 B2 | | 10/2007 | Pui et al. | |
| 7,498,063 B2 | | 3/2009 | Pui et al. | |
| 7,951,428 B2 | | 5/2011 | Hoerr et al. | |
| 7,972,661 B2 | | 7/2011 | Pui et al. | |
| 8,123,147 B2 | * | 2/2012 | Fulkerson | B05B 5/032 118/621 |
| 9,050,611 B2 | | 6/2015 | Pui et al. | |
| 9,108,217 B2 | | 8/2015 | Hoerr et al. | |
| 2007/0278103 A1 | | 12/2007 | Hoerr et al. | |
| 2008/0308095 A1 | | 12/2008 | Trees et al. | |
| 2009/0140083 A1 | * | 6/2009 | Seitz | B05B 5/0533 239/690.1 |
| 2009/0230222 A1 | | 9/2009 | Kim et al. | |

FOREIGN PATENT DOCUMENTS

| | | |
|---|---|---|
| WO | 0183101 A1 | 11/2001 |
| WO | 0187491 A1 | 11/2001 |
| WO | 2004076057 A1 | 9/2004 |
| WO | 2008002556 A1 | 1/2008 |
| WO | 2010149197 A1 | 12/2010 |

* cited by examiner

ELECTROHYDRODYNAMIC ATOMIZATION NOZZLE EMITTING A LIQUID SHEET

BACKGROUND

Electroh ment, high-voltage source 106 provides a voltage ranging from 13 kV to 16 kV to spray end 108. Alternatively, high-voltage source may apply any voltage to nozzle 104 that enables system 100 to function as described herein.

System 100 also includes a monitoring system 110. Monitoring system 110 includes a microscopic lens 112, a digital camera 114, a monitor 116, and a computer 118, which enable monitoring system 110 to monitor the spray produced by nozzle 104.

System 100 also includes a current system 120. Current system 120 includes a multimeter 122 electrically coupled to a ground 124 and electrically coupled to ring 126 across a resistor 128. By measuring the voltage across resistor 128, current system 120 can measure the current of the spray produced by nozzle 104. Through multimeter 122, ring 126 is also electrically coupled to ground 124.

Figure 2:
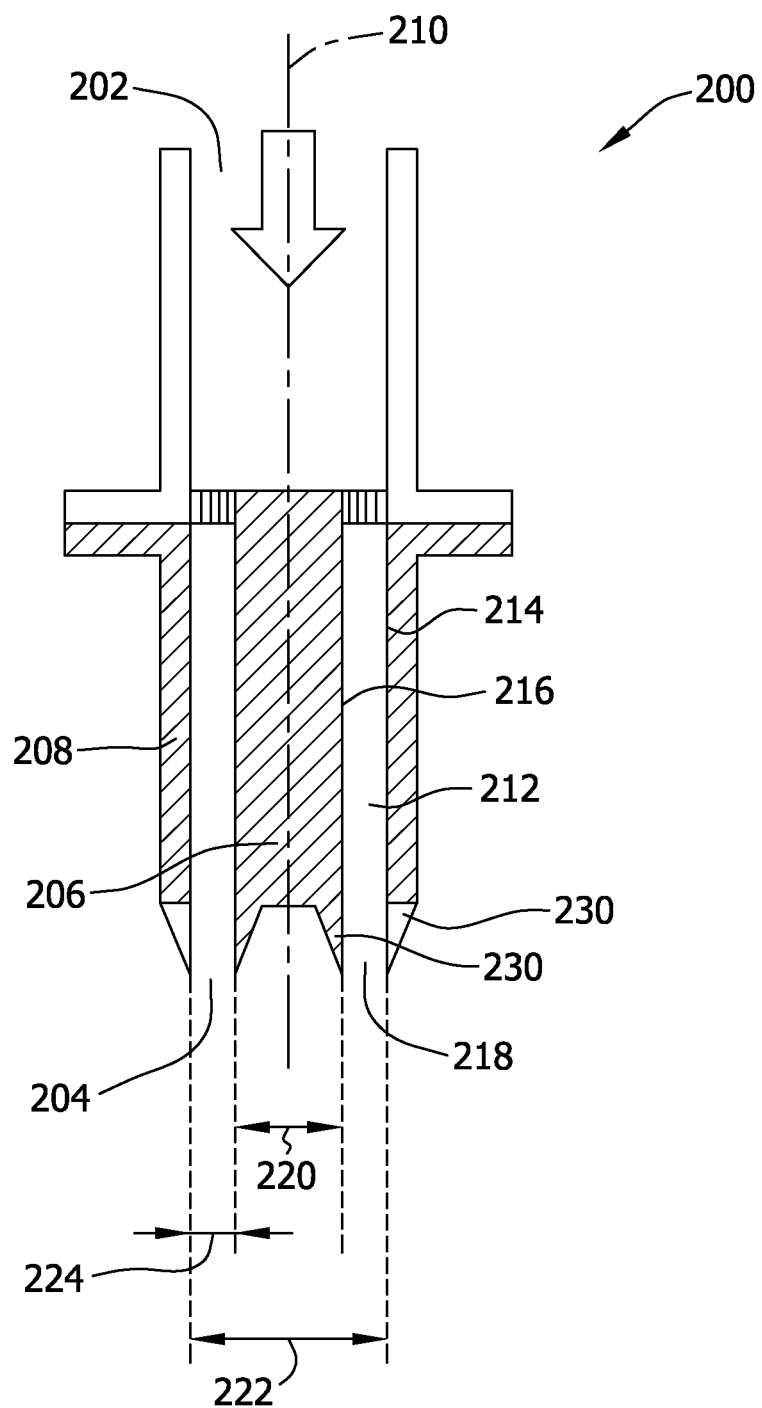

FIG. 2 is a cross-sectional view of an exemplary nozzle 200 that may be used with system 100. Nozzle 200 includes a source end 202 and a spray end 204. Nozzle 200 includes an inner rod 206 coaxially aligned with an outer tube 208 along a longitudinal axis 210 of nozzle 200. An annular flow channel 212 is defined between an inner surface 214 of outer tube 208 and an outer surface 216 of inner rod 206. At spray end 204, annular flow channel 212 becomes a circular slit 218. In an exemplary embodiment, an inner diameter 220 of circular slit 218 is 2,950 µm, and an outer diameter 222 of circular slit 218 is 3,250 µm, such that a width 224 of circular slit 218 is 150 µm. Alternatively circular slit 218 may have any dimensions that enable nozzle 200 to function as described herein.

In operation, syringe pump 102 applies a pressure to a spray liquid, such that the spray liquid is pushed towards nozzle 200 and received at source end 202 of nozzle 200. The spray liquid is then evenly distributed into annular flow channel 212 and emitted from circular slit 218 as a thin liquid sheet. In the exemplary embodiment shown in FIG. 2, the emitted liquid sheet is substantially cylindrical.

Nozzle 200 further includes one or more notches 230 proximate to circular slit 218. As used herein, a "notch" refers to a protruding element that extends from a spray end of a nozzle, such as notches 230 extending from spray end 204 of nozzle 200. For example, such notches may extend or protrude further in the direction of the spray jet than other regions of the spray end separating such notches. In an exemplary embodiment, notches 230 are located on both inner rod 206 and outer tube 208 (see, also, notches 330 of FIG. 6GC). Alternatively, notches 230 may be located only on inner rod 206 (see, e.g., notches 330 of FIG. 6GB) or outer tube 208 (see, e.g., notches 330 of FIG. 6GA). When high-voltage source 106 applies a voltage to spray end 204 of nozzle 200, the shape and configuration of notches 230 facilitate local enhancement of an electric field at notches 230. When the spray liquid reaches the circular slit 218, it exits nozzle 200 as a thin liquid sheet due to the shape of annular flow channel 212. With a sufficiently high voltage applied to spray end 204 of nozzle 200, the thin liquid sheet is separated into multiple jets. Each jet is located at one of notches 230 due to the locally intensified electric field at each notch 230. Further, with a high enough voltage applied to spray end 204, stable multi jet operation may be achieved. In some embodiments, "stable multi jet operation" means that a jet of spray liquid is emitted from each notch 230 on nozzle 200.

Figure 3A:
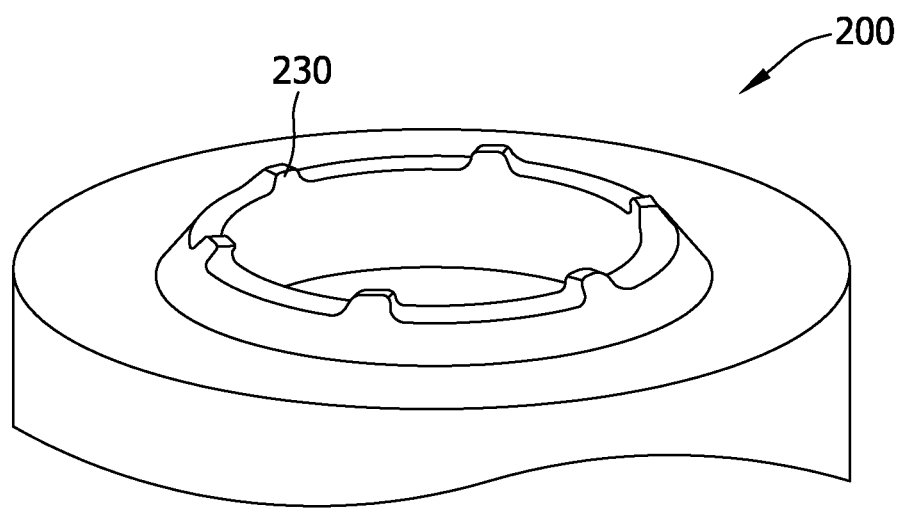
Figure 3B:
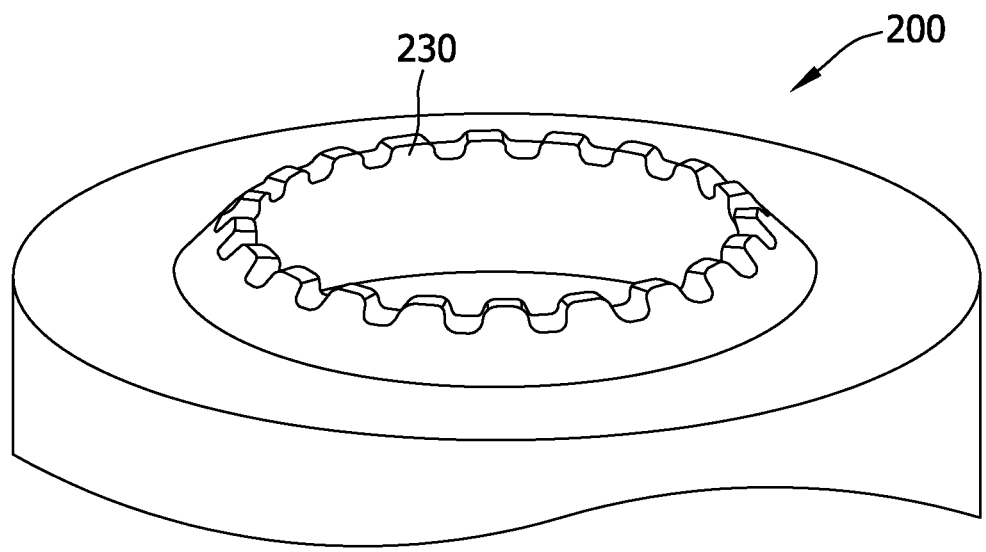
Figure 4A:
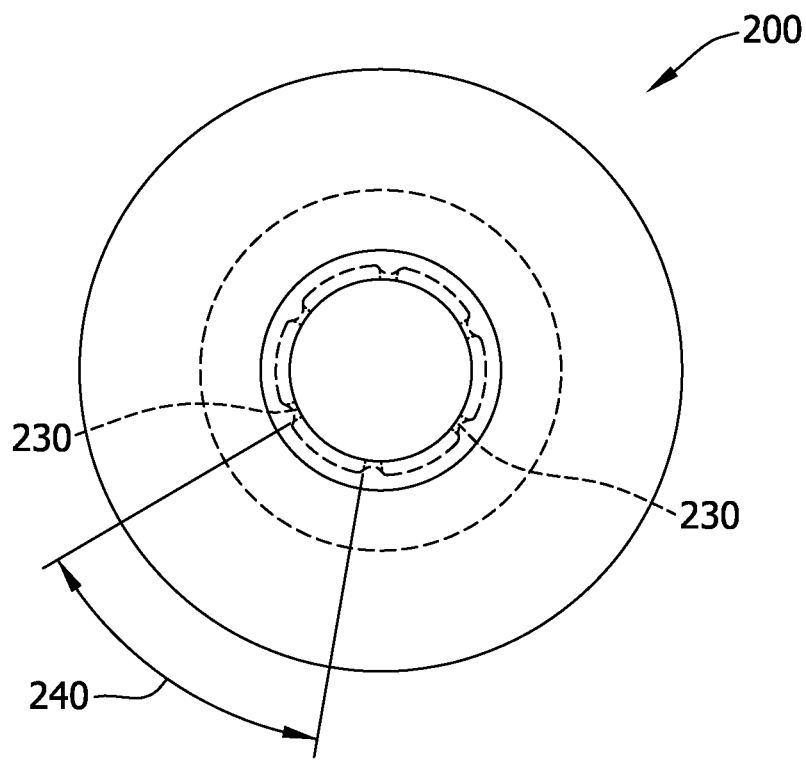
Figure 4B:
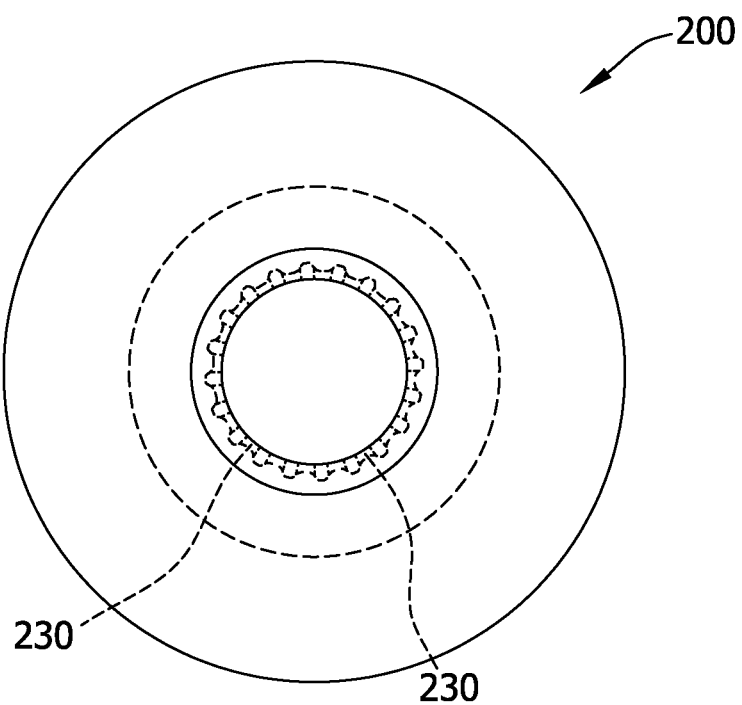

FIGS. 3A and 3B are perspective views of exemplary nozzles 200 that may be used with the system of FIG. 1. FIGS. 4A and 4B are plan views of the nozzles 200 shown in FIGS. 3A and 3B. The embodiment shown in FIGS. 3A and 4A includes six notches 230, and the embodiment shown in FIGS. 3B and 4B includes twenty notches 230. Notches 230 are circumferentially spaced apart from one another by a circumferential distance, 240. In some embodiments, circumferential distance 240 is no less than a size of a notch 230. Circumferential distance 240 is chosen such that the number of notches 230 is maximized while maintaining regions of intensified electric field. That is, if circumferential distance 240 between notches 230 is too small, the electric field generated at one notch 230 will interfere with the electric field generated at an adjacent notch 230. However, as the circumferential distance 240 between notches 230 increases, fewer notches 230 can be located on nozzle 200. With fewer notches 230, fewer jets are created, and the overall mass throughput of nozzle 200 is decreased.

Figure 5A:
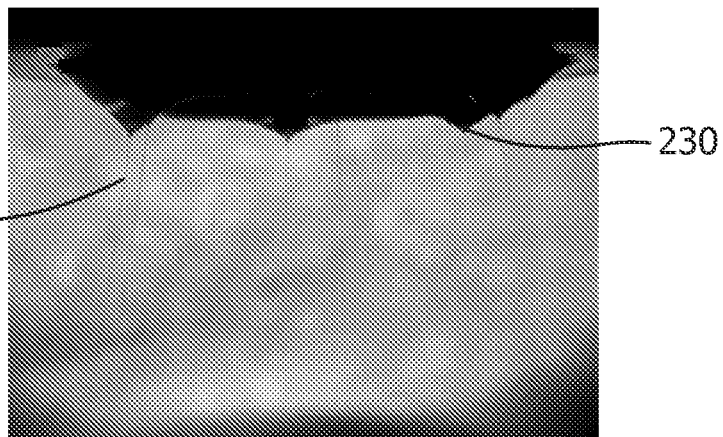
Figure 5B:
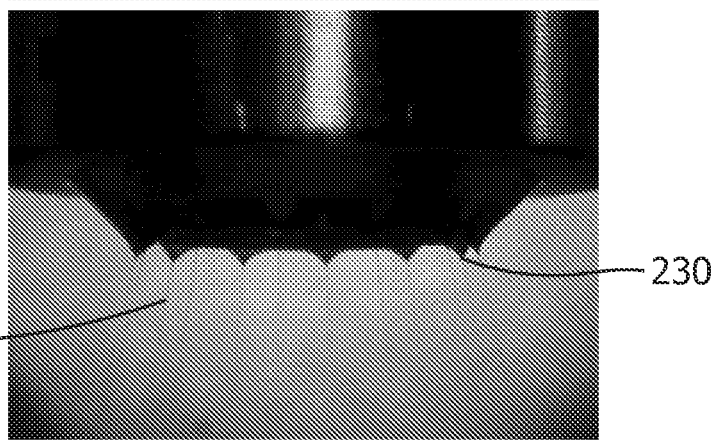
Figure 5C:
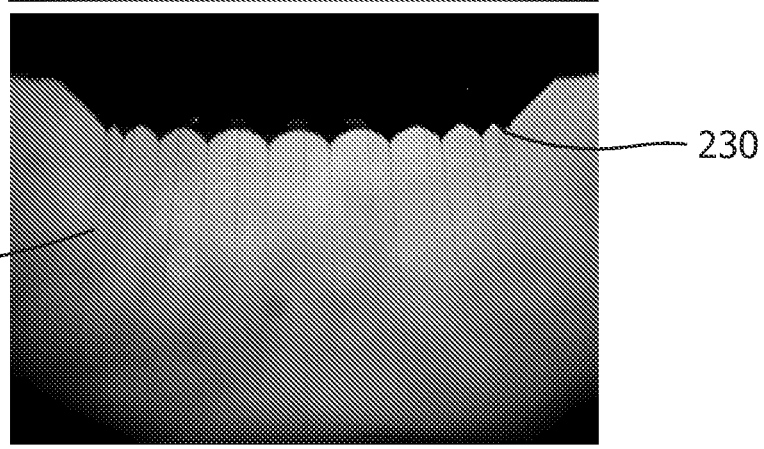

FIGS. 5A-5C are images of nozzles 200 producing multiple jets 250 of a spray liquid. The nozzles 200 in FIGS. 5A, 5B, and 5C include six, twelve, and twenty notches 230, respectively.

FIGS. 6A-6L are cross-sectional views of exemplary nozzles 300 that may be used with the system of FIG. 1. As demonstrated by the embodiments shown in FIGS. 6A-6L, several different configurations of nozzle 300 enable nozzle 300 to function as described herein. Moreover, configurations of nozzle 300 are not limited to those specifically described herein.

Each nozzle 300 in FIGS. 6A-6L includes a source end 302 and a spray end 304. Further, each nozzle 300 includes an inner rod 306 coaxially aligned with an outer tube 308 along a longitudinal axis 310 of nozzle 300. An annular flow channel 312 is defined between an inner surface 314 of outer tube 308 and an outer surface 316 of inner rod 306. At spray end 304, annular flow channel 312 becomes a circular slit 318. Further, at spray end 304, inner rod 306 includes a center piece 320, and outer tube 308 includes an end portion 322. Each nozzle 300 also includes a plurality of notches 330 which function substantially similar to notches 230 shown in FIG. 2. The embodiments of FIGS. 6A-6L are each discussed in detail below.

Figure 6A:
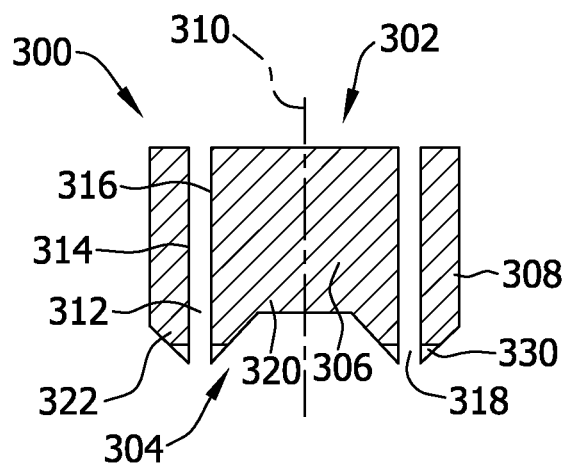

In the embodiment of nozzle 300 shown in FIG. 6A, both inner rod 306 and outer tube 308 includes notches 330 thereon. Further, center piece 320 is not retracted or extended with respect to end portion 322. During operation of the embodiment shown in FIG. 6A, a spray liquid is emitted from circular slit 318.

Figure 6B:
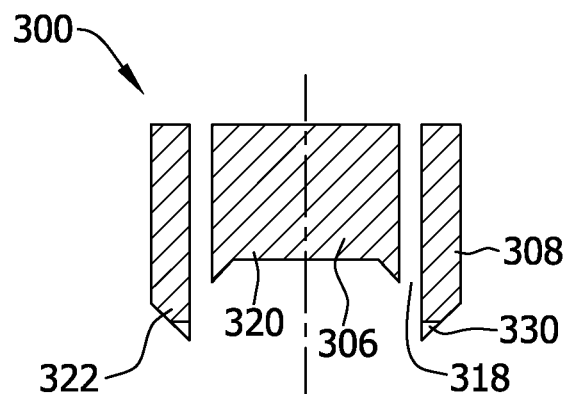

In the embodiment of nozzle 300 shown in FIG. 6B, only outer tube 308 includes notches 330 thereon. That is, inner rod 306 does not include notches 330. Further, center piece 320 is retracted with respect to end portion 322. During operation of the embodiment shown in FIG. 6B, the spray liquid is emitted from circular slit 318.

Figure 6C:
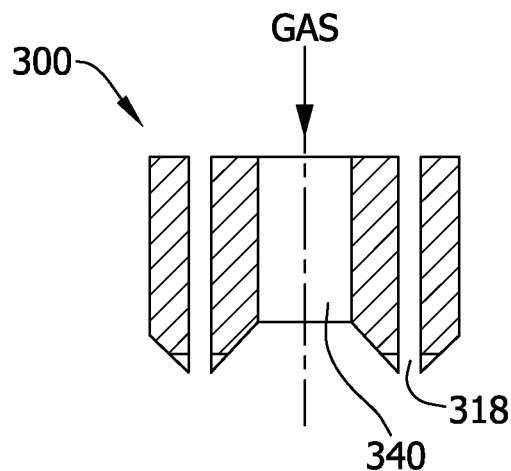
Figure 6D:
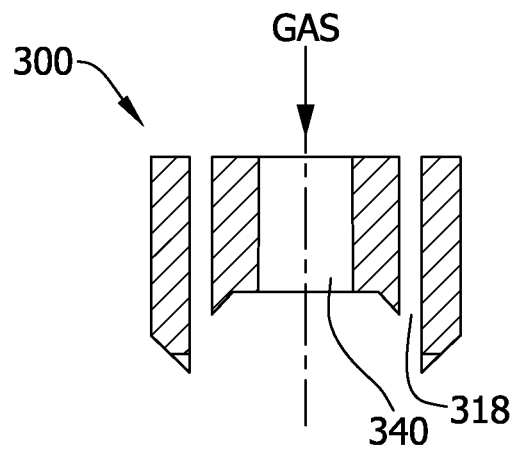

The embodiment of nozzle 300 shown in FIG. 6C is substantially similar to the embodiment shown in FIG. 6A, except that the embodiment shown in FIG. 6C includes a central flow channel 340 defined through inner rod 306. Likewise, the embodiment of nozzle 300 shown in FIG. 6D is substantially similar to the embodiment shown in FIG. 6B, except that the embodiment shown in FIG. 6D includes central flow channel 340 defined through inner rod 306. In the embodiments of FIGS. 6C and 6D, a stabilizing gas is emitted from central flow channel 340. The emitted gas facilitates maintaining the thin liquid sheet shape of the spray liquid when the spray liquid is emitted from circular slit 318.

Figure 6E:
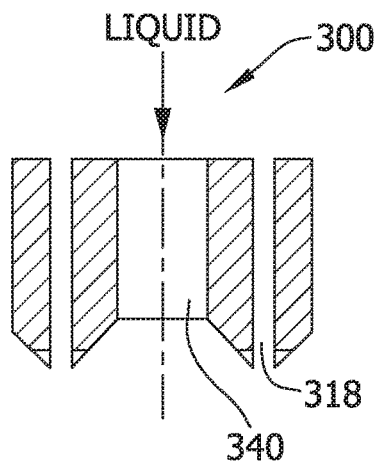
Figure 6F:
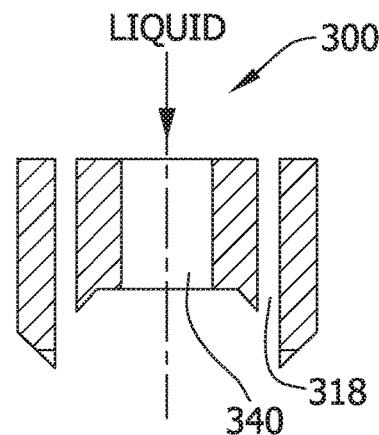
Figure 6G:
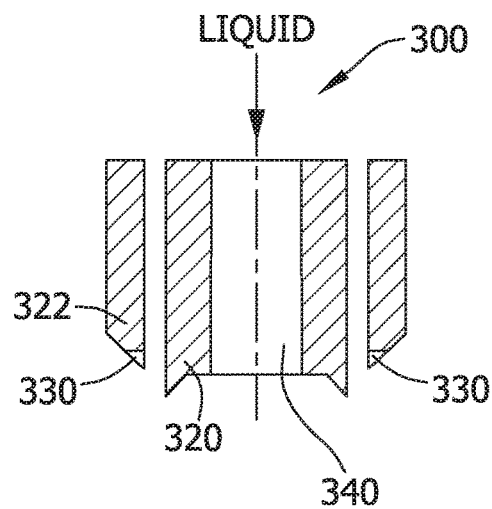
Figure 6G:
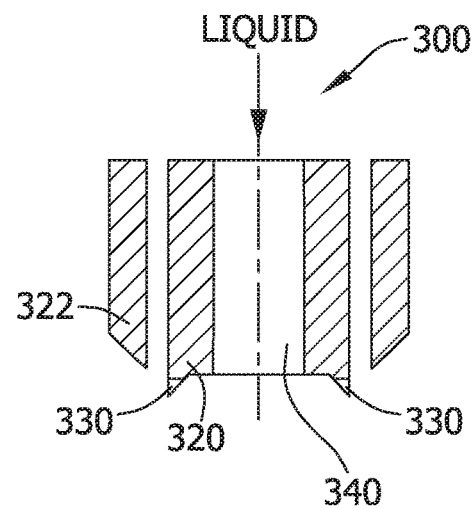
Figure 6G:
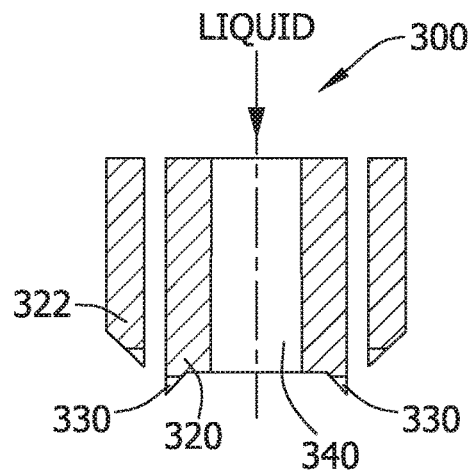

The embodiments of nozzle 300 shown in FIGS. 6E and 6F are substantially similar to the embodiments shown in FIGS. 6C and 6D respectively, except that instead of a stabilizing gas, a stabilizing liquid is emitted from central flow channel 340. Similar to the stabilizing gas, the stabilizing liquid facilitates maintaining the thin liquid sheet shape of the spray liquid when the spray liquid is emitted from circular slit 318. The embodiment of nozzle 300 shown in FIG. 6GA is substantially similar to the embodiment shown in FIG. 6F, except that center piece 320 is extended with respect to end portion 322.

Figure 6H:
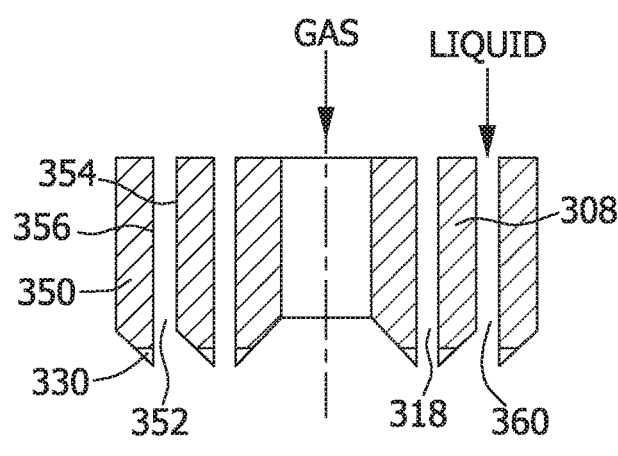
Figure 6I:
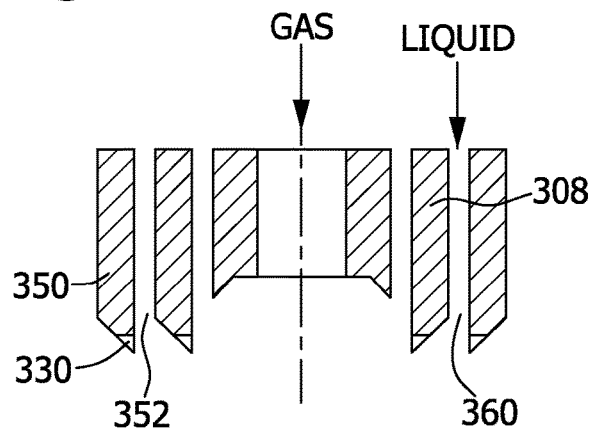

The embodiments of nozzle 300 shown in FIGS. 6H and 6I are substantially similar to the embodiments shown in FIGS. 6C and 6D respectively, except that the embodiments of FIGS. 6H and 6I further include a second outer tube 350. Second outer tube 350 is concentrically aligned with outer tube 308 such that a second annular flow channel 352 is defined between an outer surface 354 of outer tube 308 and an inner surface 356 of second outer tube 350. Second annular flow channel 352 becomes a second circular slit 360 at spray end 304.

Figure 6J:
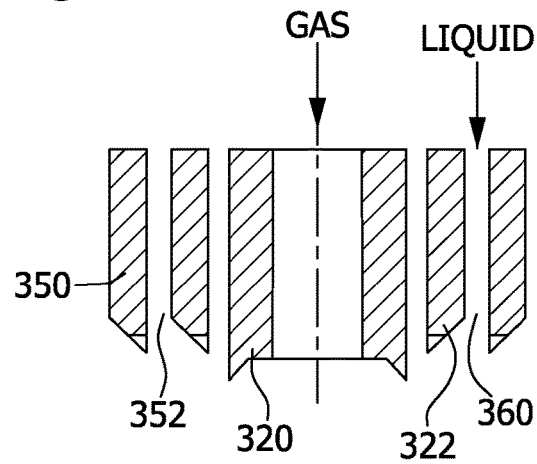

In the embodiments shown in FIGS. 6H and 6I, second outer tube 350 includes notches 330 thereon. In addition to the spray liquid emitted from first circular slit 318, a sheath liquid is emitted from second circular slit 360 in a thin liquid sheet shape. With the spray liquid and the sheath liquid both emitted from nozzle 300, particle encapsulation is facilitated, such that the particles produced by nozzle 300 include particles of spray liquid encapsulated by particles of sheath liquid and/or particles of sheath liquid encapsulated by particles of spray liquid. Similar to the embodiments shown in FIGS. 6C and 6D, a stabilizing gas emitted from central flow channel 340 facilitates maintaining the thin liquid sheet shape of the spray liquid and the sheath liquid. Alternatively, similar to FIGS. 6E-6G, a stabilizing liquid may be emitted from central flow channel 340. The embodiment shown in FIG. 6J is substantially similar to the embodiment shown in FIG. 6I, except that the center piece 320 is extended with respect to end portion 322.

Figure 6K:
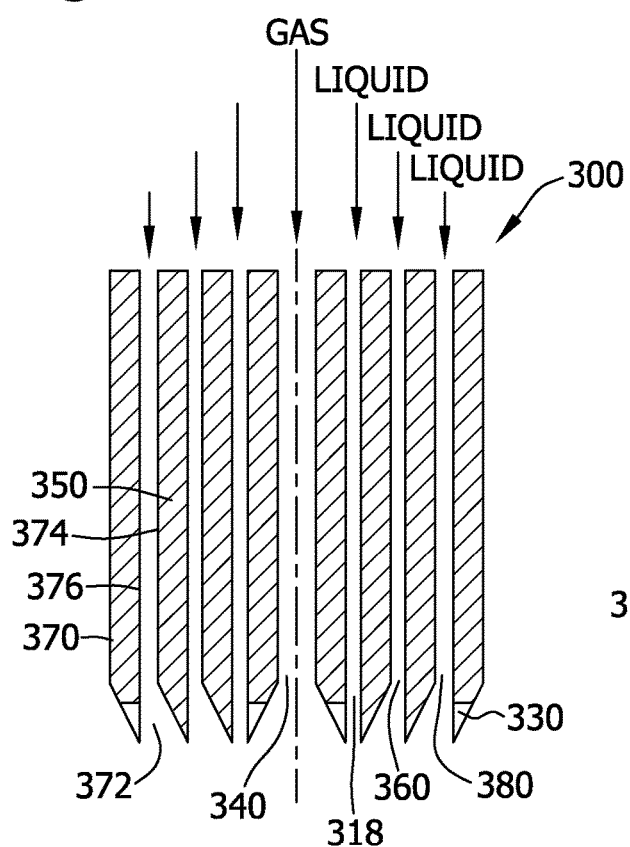

The embodiment of nozzle 300 shown in FIG. 6K is substantially similar to the embodiment shown in FIG. 6H, except that the embodiment of FIG. 6K further includes a third outer tube 370. Third outer tube 370 is concentrically aligned with second outer tube 350 such that a third annular flow channel 372 is defined between an outer surface 374 of second outer tube 350 and an inner surface 376 of third outer tube 370. Third annular flow channel 372 becomes a third circular slit 380 at spray end 304.

In the embodiment shown in FIG. 6K, third outer tube 370 includes notches 330 thereon. In addition to the spray liquid emitted from first circular slit 318 and the sheath liquid emitted from second circular slit 360, an outer liquid is emitted from third circular slit 380 in a thin liquid sheet shape. The emission of liquids from first circular slit 318, second circular slit 360, and third circular slit 380 facilitates particle encapsulation and the production of multi-layered particles. Similar to the embodiments shown in FIGS. 6C and 6D, a stabilizing gas emitted from central flow channel 340 facilitates maintaining the thin liquid sheet shape of the emitted liquids. Alternatively, similar to FIGS. 6E-6G, a stabilizing liquid may be emitted from central flow channel 340.

Figure 6L:
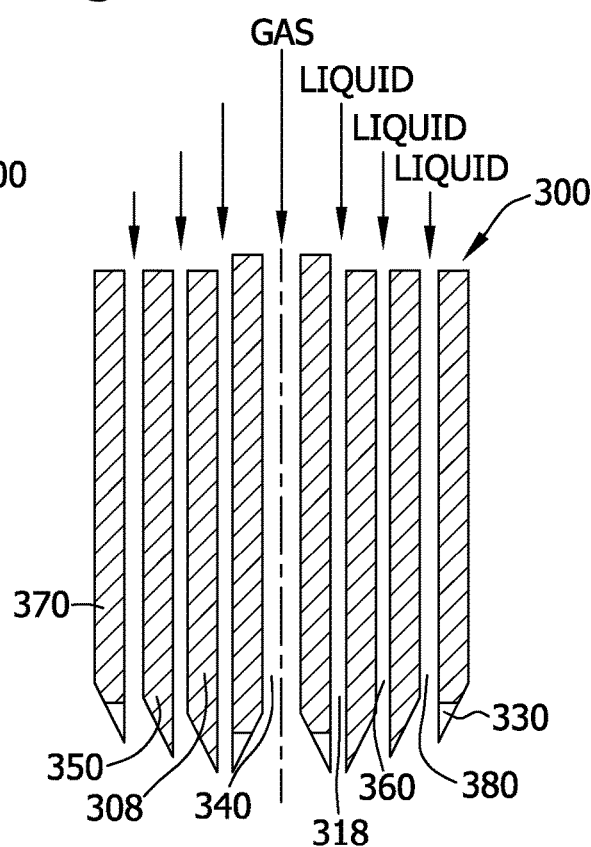

The embodiment shown in FIG. 6L is substantially similar to the embodiment shown in FIG. 6K, except that the circular slits 318, 360, and 380 are arranged in a stepped configuration, such that outer tube 308 is extended with respect to second outer tube 350, and second outer tube 350 is extended with respect to third outer tube 370. Due to the stepped configuration, less voltage may be applied to the embodiment shown in FIG. 6L than the embodiment shown in FIG. 6K to achieve stable multi-jet operation. In the embodiments shown in FIGS. 6L and 6K, the outer liquid emitted from third circular slit 380 may be the same liquid as at least one of the spray liquid emitted from first circular slit 318 and the sheath liquid emitted from second circular slit 360. Alternatively, the spray liquid, the sheath liquid, and the outer liquid may all be different liquids. Furthermore, while in the embodiments shown in FIGS. 6A-6L, certain flow channels are denoted as containing a gas or a liquid, alternatively, any suitable fluid (i.e., gas, liquid) may be provided in any flow channel that enables nozzle 300 to function as described herein.

Multiple experiments were executed utilizing the nozzles described herein. In the following examples, Isopropanol was selected as the spray liquid, and nitric acid was used as an ion additive to vary the electrical conductivity of the spray liquid from 0.0079 µS/cm (pure isopropanol) to 1,044 µS/cm. The electrical conductivity of the spray liquid was measured by a conductivity meter (Orion 162A, Thermo Electron Corporation), and the electrical resistance of pure isopropanol was measured by a lab-made liquid cell. Alternatively, those of ordinary skill in the art will understand that any spray liquid may be utilized which allows system 100 to function as described herein.

Figure 7:
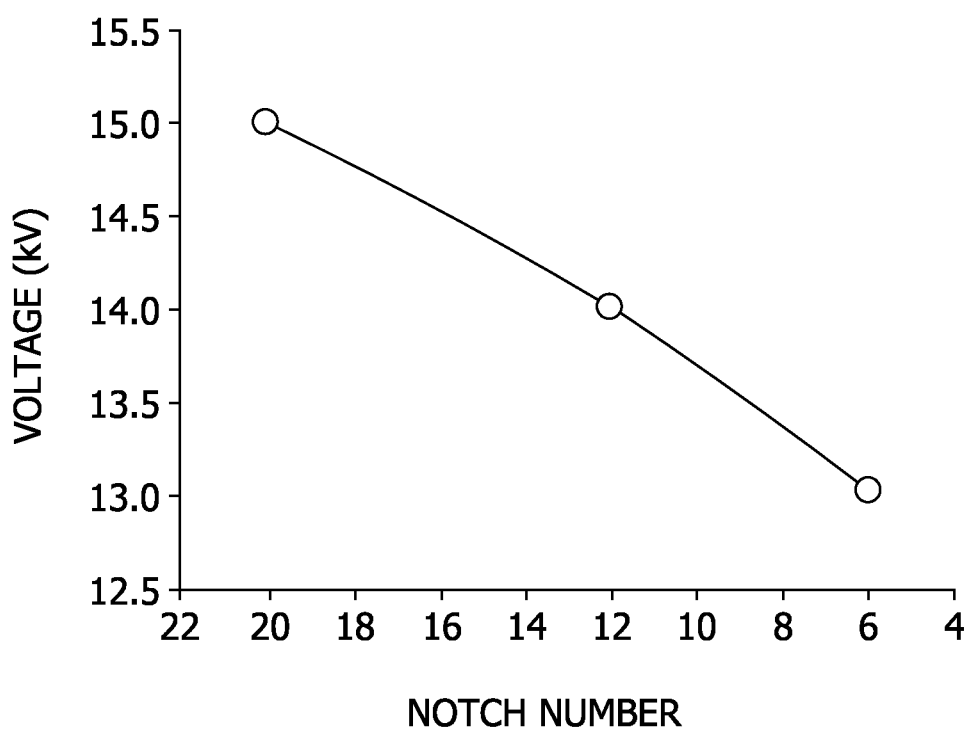

FIG. 7 is a graph that illustrates the applied voltage for establishing stable multi-jet operation for nozzles having various numbers of notches. The graph demonstrates that the applied voltage increases with the number of notches. It was also determined that the applied voltage for establishing stable multi jet operation is also slightly proportional to the feed flowrate of the spray liquid.

Figure 8A:
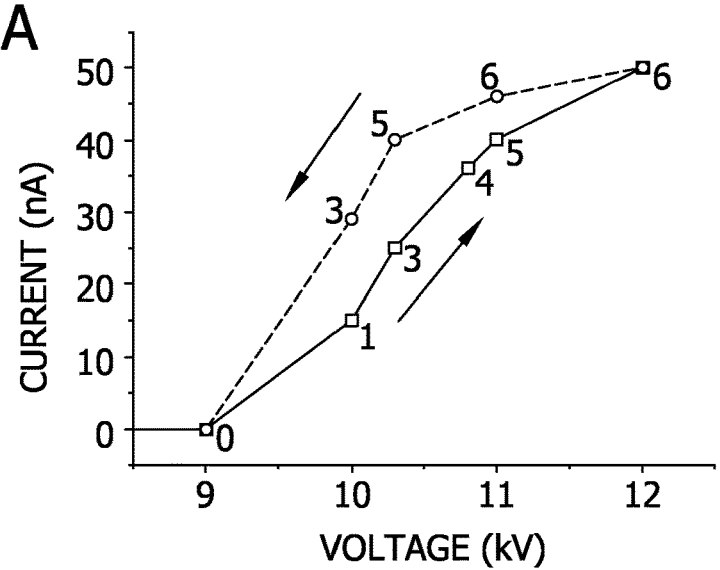
Figure 8B:
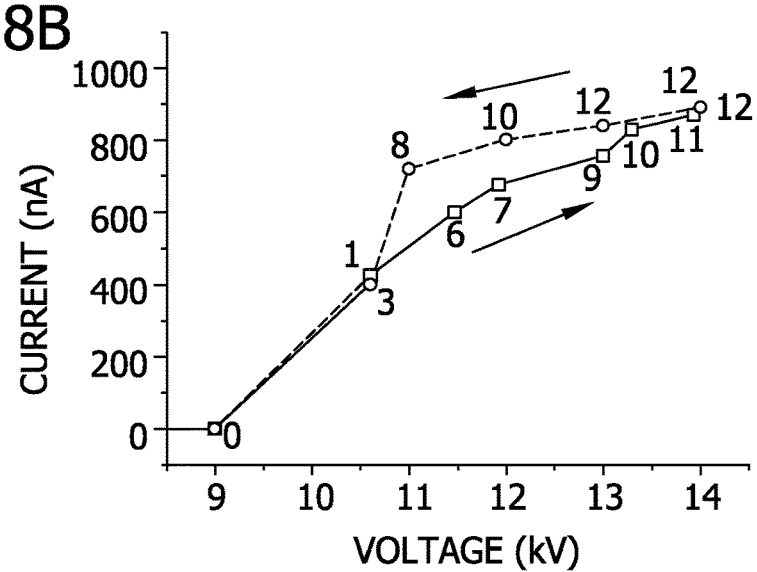
Figure 8C:
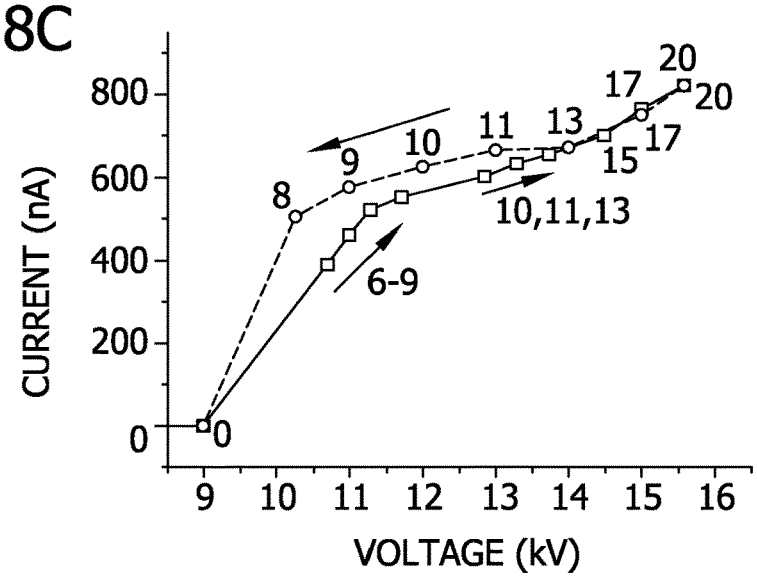

In one example, to study the evolution in the formation of multiple jets, the spray current was measured, and the number of jets was counted as the applied voltage was continuously increased and then decreased. FIGS. 8A-8C are graphs illustrating the spray current as a function of the applied voltage for nozzles with six, twelve, and twenty notches, respectively. The spray current and the number of jets increased with the increase of applied voltage. The stable multi jet operation, in which the number of jets is the same as the number of notches, was achieved at a sufficiently high applied voltage. When the applied voltage was reduced, the number of jets correspondingly decreased. Further, as shown in the graphs, a hysteresis phenomenon was observed.

Figure 9:
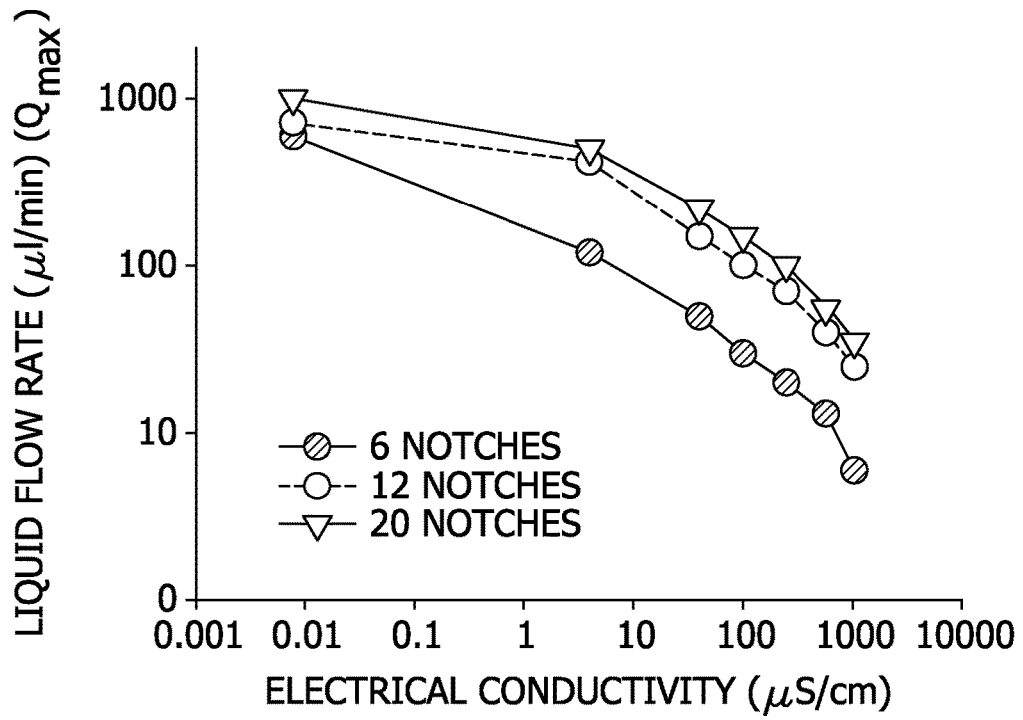

In another example, to determine the mass throughput of the nozzles, spray liquids with various electrical conductivities were used to find the maximum liquid flowrate (Qmax) for nozzle operation. FIG. 9 is a graph that illustrates the maximum liquid flowrate as a function of the electrical conductivity of the spray liquid. The graph demonstrates that the value of Qmax significantly decreases as the electrical conductivity of the spraying liquid increases, due to the fact that spray liquids with higher electrical conductivity generally use a stronger electric field to establish stable multi-jet operation. The graph also demonstrates that Qmax increases as the number of notches increases. This is because a greater number of notches allow more jets to be established, thus increasing the spray liquid flowrate and the overall mass throughput.

Figure 10:
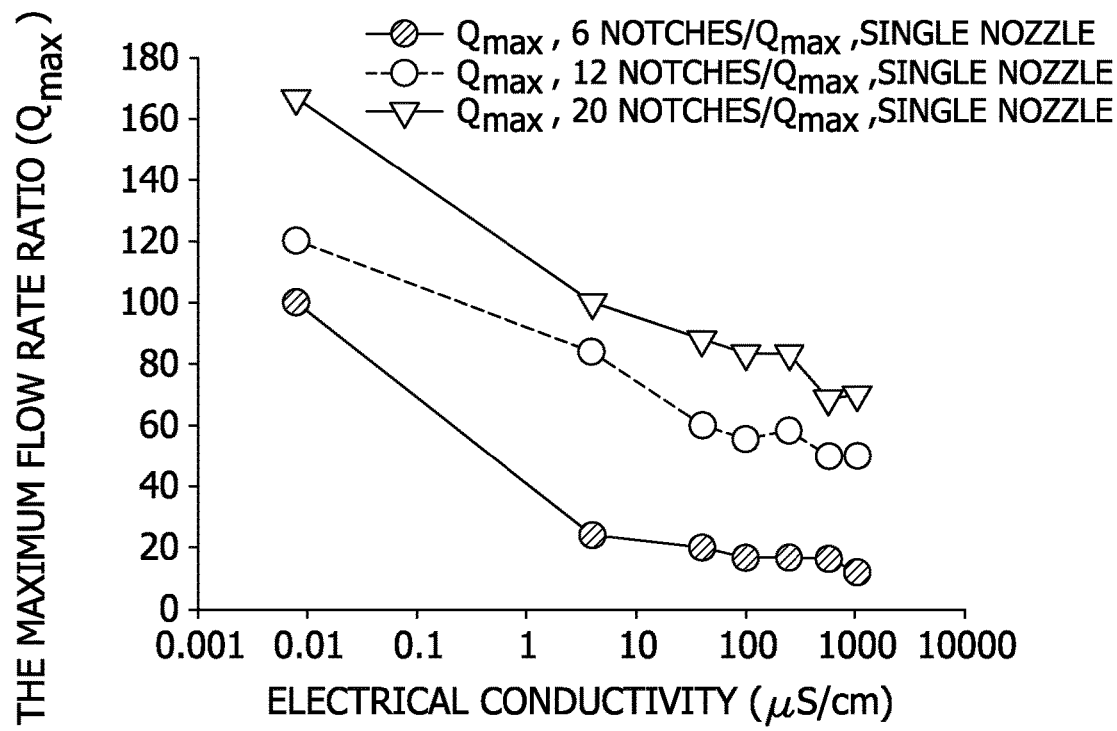

FIG. 10 is a graph illustrating a ratio of the maximum liquid flowrate of the liquid sheet nozzles described herein to the maximum liquid flowrate of a known single-capillary nozzle as a function of the electrical conductivity of the spray liquid. In this example, the diameter of the single-capillary nozzle and the width of the circular slit in the liquid sheet nozzle were both 150 µm. As illustrated in the graph of FIG. 10, when using a spray liquid with an electrical conductivity of 0.0079 µS/cm, the maximum liquid flowrate, Qmax, of the liquid sheet nozzle with 20 notches was one hundred and sixty-six times greater than the maximum liquid flowrate for the single-capillary nozzle. Further, when using a spray liquid with an electrical conductivity of 1,044 µS/cm µS/cm, the maximum liquid flowrate of the liquid sheet nozzle with twenty notches was seventy times greater than the maximum liquid flowrate for the single-capillary nozzle.

Notably, the value of Qmax for a liquid sheet nozzle with twenty notches is much higher than the sum of the total liquid flowrates for twenty single-capillary nozzles. This same phenomenon was also observed using liquid sheet nozzles with six and twelve notches. This indicates that, as compared to existing one-dimensional and two-dimensional arrays of single-capillary nozzles, liquid sheet nozzles have potential to drastically increase the mass throughput for spray liquids having a wide range of electrical conductivity.

Figure 11:
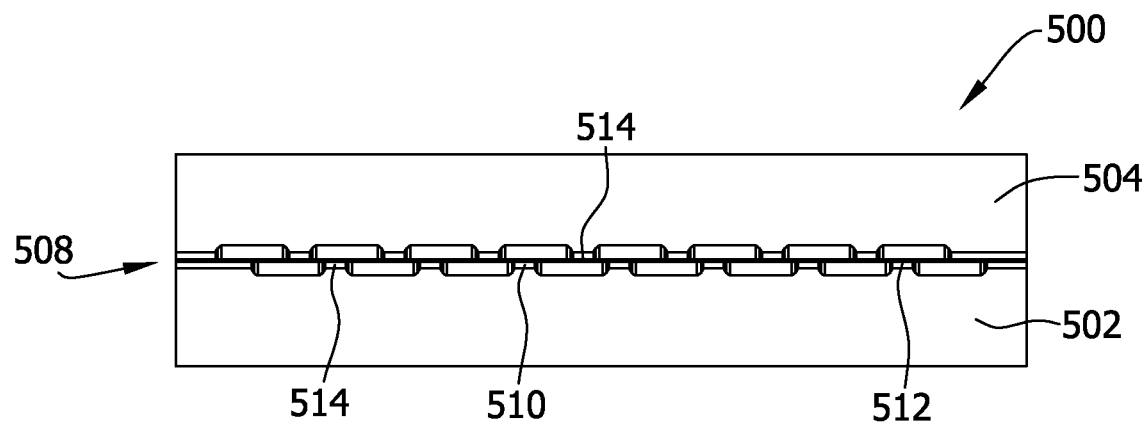
Figure 12:
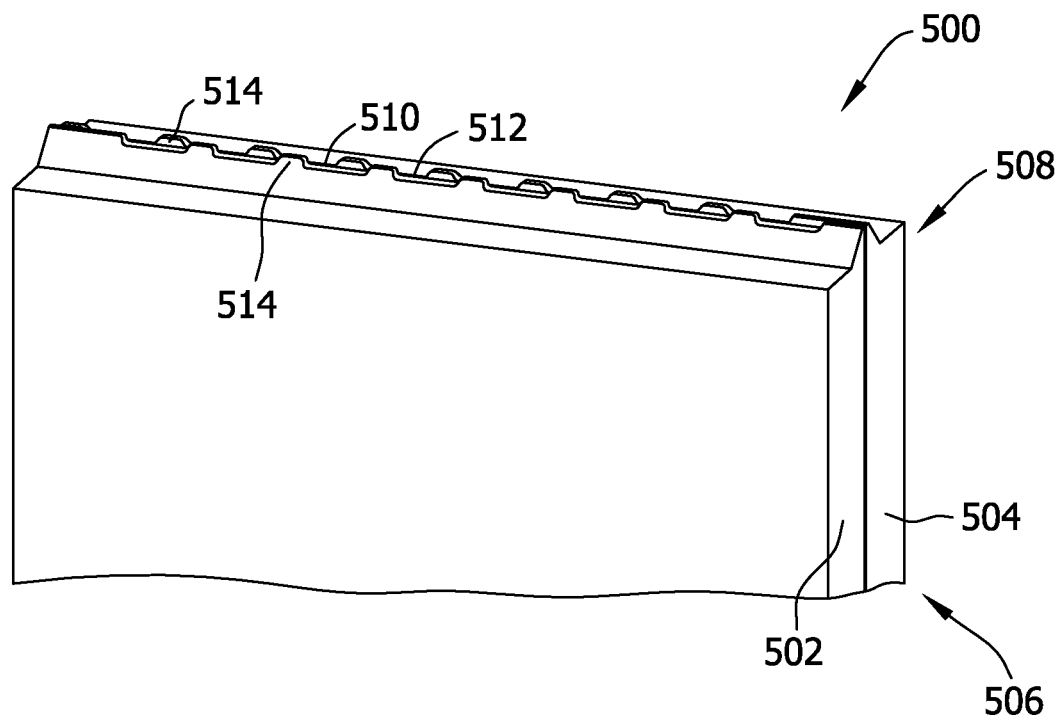

FIG. 11 is a plan view of an alternative nozzle 500 that may be used with system 100. FIG. 12 is a perspective view of nozzle 500 shown in FIG. 11. In an exemplary embodiment, nozzle 500 includes a first plate 502, a second plate 504, a source end 506, and a spray end 508. A planar flow channel 510 is defined between first plate 502 and second plate 504. Planar flow channel 510 becomes a linear slit 512 at spray end 508. In operation, a spray liquid is emitted from nozzle 500 from linear slit 512. While the thin liquid sheet emitted from nozzle 200 is substantially cylindrical, the thin liquid sheet emitted from nozzle 500 is substantially planar.

In an exemplary embodiment, a plurality of notches 514 are located on both first plate 502 and second plate 504, and staggered with respect to one another. Alternatively, notches 514 may only be located on one of first plate 502 and second plate 504. With a voltage applied to notches 514, notches 514 facilitate separating the thin liquid sheet into a plurality of jets, substantially similar to notches 230 of nozzle 200.

The nozzles illustrated in FIGS. 1-6L, 11, and 12 constitute exemplary means for emitting a liquid sheet. Further, the notches illustrated in FIGS. 2-6L, 11, and 12 constitute exemplary means for separating a liquid sheet emitted by a nozzle into multiple jets. Moreover, nozzles illustrated in FIGS. 6C-6L constitute exemplary means for maintaining a shape of a liquid sheet emitted from a nozzle.

In addition to the cylindrical and planar nozzles specifically described herein, those of ordinary skill in the art will understand that any nozzle shape and/or configuration may be utilized which allows system 100 to function as described herein.

Embodiments described herein enable electrohydrodynamic atomization, or electrospray (ES), using nozzles that produce a thin liquid sheet. The methods and systems described herein increase the mass throughput of ES systems while decreasing the design and manufacturing costs as compared to known ES systems utilizing multiple single-capillary nozzles. The nozzles described herein include annular and/or planar slits designed emit a thin liquid sheet of spray liquid. To separate the thin liquid sheet into multiple jets and to anchor the jets for stable operation, a plurality of notches are included at the annular and/or planar slits. That is, each notch anchors a corresponding jet by preventing the corresponding jet from migrating around the nozzle, substantially fixing the position of the corresponding jet. When a voltage is applied to the nozzles described herein, these notches enable local enhancement of an electric field. Further, stable multi jet operation of the nozzles described herein can be established for a wide range of spray liquids having various electrical conductivities.

Moreover, as compared to known ES systems utilizing arrays of single-capillary nozzles, multiple liquid flow feeding and/or distribution channels are no longer necessary for the nozzles described herein. As such, the design concept and fabrication of the nozzles described herein is simpler than known nozzles, enabling flexibility in the design and/or geometry of the nozzles.

Through experimentation utilizing the nozzles described herein, it was demonstrated that the applied voltage for establishing stable multi-jet operation increased as both the number of jets and the liquid flowrate increased. Further, the maximum operational flowrate through the nozzles described herein was a function of the electrical conductivity of the spray liquid. Moreover, the maximum flowrate for liquid sheet nozzles with various numbers of notches was consistently greater than the total flowrate sum of an array of an equivalent number of single-capillary nozzles. Accordingly, the liquid sheet nozzles described herein enable superior ES techniques. Further, the liquid sheet shape of the spray liquid, as opposed to the cone jet emitted from known single-capillary nozzles, enables the nozzle design to have various geometries, including, but not limited to annular and/or planar slits.

The order of execution or performance of the operations in the embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nozzle for electrohydrodynamic atomization, said nozzle comprising:
    an inner rod having an outer surface;
    an outer tube concentrically aligned with and spaced from said inner rod, said outer tube having an inner surface and a length;
    a longitudinally extending channel defined between said inner rod and said outer tube, said channel defining a circular slit, the circular slit having a width defined by said outer surface of said inner rod and said inner surface of said outer tube; and
    at least one electrically chargeable notch located on said inner rod and proximate said circular slit, wherein said inner rod extends beyond the length of the outer tube such that at least a portion of the outer surface of the inner rod is exposed to the inner surface of the outer tube, the at least one electrically chargeable notch being spaced from the outer tube.

2. A nozzle in accordance with claim 1, wherein said inner rod comprises a central flow channel defined therethrough.

3. A nozzle in accordance with claim 2, wherein said central flow channel is configured to facilitate flow of at least one of a stabilizing gas and a stabilizing liquid therethrough.

4. A nozzle in accordance with claim 1, wherein said outer tube is free of electrically chargeable notches.

5. A nozzle in accordance with claim 1, wherein said inner rod comprises a center piece at the spray end of said nozzle and said outer tube comprises an end portion at the spray end of said nozzle, said center piece extended with respect to said end portion.

6. A nozzle in accordance with claim 1, wherein said at least one electrically chargeable notch comprises a plurality of electrically chargeable notches, each notch of said plurality of electrically chargeable notches being spaced a distance apart from one another.

7. A system for electrohydrodynamic atomization, said system comprising:
a nozzle comprising:
a source end;
a spray end;
a first component comprising a first surface;
a second component comprising a second surface and being aligned with said first component, said second surface being spaced from said first surface of said first component;
longitudinally extending fluid channel defined between said first surface and said second surface, said fluid channel defining an exit slit, said exit slit being continuous and having a width defined by said first surface of said first component and said second surface of said second component;
at least one electrically chargeable notch located on said first component proximate said exit slit;
a voltage source electrically coupled to said nozzle and configured to supply a voltage to said at least one electrically chargeable notch; and
a pump in flow communication with said source end of said nozzle, said pump configured to provide a spray liquid through said nozzle,
wherein said first component extends beyond the length of the second component such that at least a portion of the outer surface of the first component is exposed from the inner surface of the second component, the at least one electrically chargeable notch being spaced from the second component.

8. A system according to claim 7, wherein said first component comprises a first plate and said second component comprises a second plate, such that said fluid channel is substantially planar.

9. A system according to claim 7, further comprising a nozzle means for emitting a liquid sheet.

10. A system in accordance with claim 7, further comprising notch means comprising a plurality of the electrically chargeable notches for separating a liquid sheet emitted from said nozzle into multiple, discrete jets.

11. A system in accordance with claim 7, further comprising means for maintaining a shape of a liquid sheet emitted from said nozzle.

12. A system in accordance with claim 7, wherein said at least one electrically chargeable notch comprises a first notch and a second notch, said first and second notches spaced a distance apart from one another such that when a voltage is supplied to said first and second notches, an electric field produced by said first notch does not interfere with an electric field produced by said second notch.

13. A method for electrohydrodynamic atomization, said method comprising:
providing a nozzle comprising an inner rod having an outer surface, an outer tube concentrically aligned with and spaced from the inner rod, the outer tube having an inner surface and a length, a longitudinally extending channel defined between the inner rod and the outer tube, the channel defining a slit, the slit having a width defined by the outer surface of the inner rod and the inner surface of the outer tube, and a plurality of notches located on at least the inner rod and proximate the circular slit wherein said inner rod extends beyond the length of the outer tube such that at least a portion of the outer surface of the inner rod is exposed from the inner surface of the outer rod, the plurality of notches being spaced from the outer tube;
supplying a voltage to the plurality of notches; and
pumping the spray liquid to the annular channel of the nozzle.

14. A method in accordance with claim 13, wherein the inner rod includes a central flow channel defined therethrough, said method further comprising pumping a stabilizing gas through the central flow channel.

15. A method in accordance with claim 13, wherein the inner rod includes a central flow channel defined therethrough, said method further comprising pumping a stabilizing liquid through the central flow channel.

16. A method in accordance with claim 13, wherein supplying a voltage comprises supplying a voltage such that a jet of spray liquid is formed at each of the plurality of notches.

* * * * *